United States Patent Office 2,798,873
Patented July 9, 1957

---

2,798,873

QUINOLINE CARBOXYLIC ACID AMIDES

Max Matter, Worb, Bern, and Albert Kobler, Guemligen, Bern, Switzerland, assignors to Ciba Pharmaceutical Products, Inc., Summit, N. J.

No Drawing. Application June 24, 1953,
Serial No. 363,936

Claims priority, application Switzerland June 28, 1952

17 Claims. (Cl. 260—284)

This invention relates to quinoline carboxylic acid amides of the formula

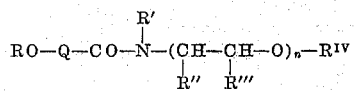

in which R, R' and $R^{IV}$ stand for hydrocarbon residues and R' and $R^{IV}$ also represent hydrogen, Q is a quinoline residue and n a whole number greater than 1, and in which the residues R" and R'" stand for hydrogen or one of them represents hydrogen and the other methyl or methoxymethyl, provided that more than

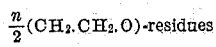

are present.

The invention relates more especially to quinoline-4-carboxylic acid amides of the formula

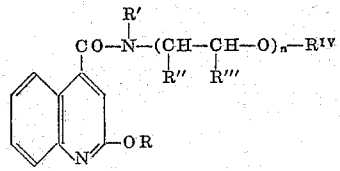

in which R is an aliphatic or alicyclic hydrocarbon residue with 2–7 carbon atoms, for instance an alkyl, alkenyl or cycloalkyl residue, more especially ethyl, propyl, allyl, butyl, isobutyl, amyl, isoamyl, cyclopentyl or hexyl, R' and $R^{IV}$ each represents hydrogen or alkyl residues with 1–7 carbon atoms, more especially methyl, ethyl, propyl or heptyl, n has the aforementioned meaning, but is above all an integer from 5–25, and R" and R'" have the above meaning.

Compounds of the formula

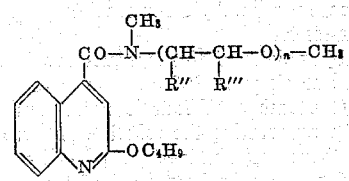

are particularly valuable, in which n is an integer from 5–9, for example, 5, 7 or 9 and R" and R'" have the aforementioned meaning, but more especially stand for hydrogen.

The new compounds possess valuable pharmacological, particularly anaesthetic properties. These vary like the physical properties, such as solubility in water and organic solvents, with the number n and the size of the different hydrocarbon residues. When the residue

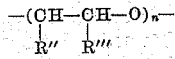

clearly predominates in any compounds obtained, the new anaesthetics are not only soluble in nearly all organic solvents with the exception of aliphatic hydrocarbons but also in water. The water-solubility is not limited to the acid or neutral pH range but extends also to an alkaline pH range, which is a special advantage of the new compounds.

The mentioned quinoline-carboxylic acid amides are to be used as medicaments or as intermediate products for the preparation of medicaments.

The new compounds are obtained according to the usual methods for the manufacture of acid amides. They may be manufactured by reacting a quinoline carboxylic acid halide of the formula

for example chloride, wherein X has the above-mentioned meaning of —OR or represents a residue which is convertible into the group —OR, and Hal stands for a halogen atom with an amine of the formula

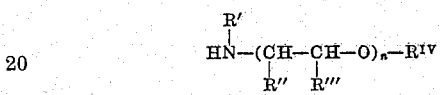

in which R'—$R^{IV}$ and n have the abovementioned meaning, advantageously in the presence of an acid-binding agent, for instance of an alkali carbonate, alkaline-earth carbonate, or of an organic tertiary base, such as pyridine, triethylamine or dimethylaniline, or in the presence of an excess of the amine. When the resulting compound contains a residue convertible into the group —OR, preferably a halogen atom, for example chlorine, it is subsequently converted into the group —OR, a halogen atom for instance by treatment with an alcohol of the formula H—OR in the form of a metal alcoholate, such as alkali alcoholate.

The quinoline carboxylic acid halides used as starting material are known or may be prepared by methods in themselves known. The amines used as starting material may be easily prepared by known methods.

Thus, reactive esters of strong inorganic or organic acids, such as hydrohalic acids, for instance hydrochloric acid or hydriodic acid, or organic sulfonic acids, for instance benzene-sulfonic acid, from an alcohol of the formula

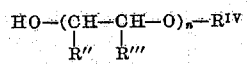

in which R"—$R^{IV}$ and n have the aforementioned meaning, which may be prepared according to the process of U. S. A. application Serial No. 210,795 of February 13, 1951, now abandoned, or any similar process, may be reacted with ammonia or primary amines to form the desired amines. Examples of such amines are:

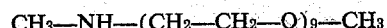
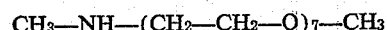
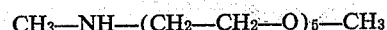
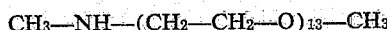
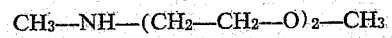

or those in which the methyl group at the end of the polyglycol chain and/or that at the amine nitrogen is replaced by an ethyl or isopropyl group. Examples of amines in which one or several ethylene residues are substituted are

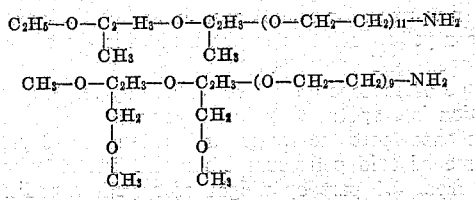

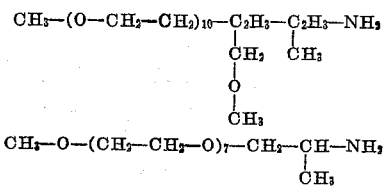

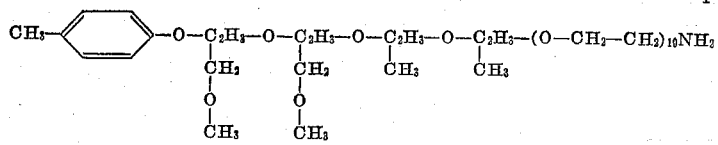

Instead of amines with a polyglycol residue of defined chain length, amine mixtures prepared from commercial polyglycols may be used in which the polyglycol residues have different chain lengths and which are therefore characterized by an average molecular weight.

The abovementioned reactions may be carried out in the presence or absence of diluents and/or condensing agents and/or catalysts in an open or closed vessel under pressure at an ordinary or a raised temperature.

The following examples illustrate the invention, the relation between part by weight and part by volume being the same as that between the gram and the cubic centimeter:

Example 1

2.5 parts by weight of 2-n-butoxy-cinchoninic acid chloride are dissolved in 25 parts by volume of benzene and added in the course of half an hour while stirring briskly to a mixture cooled in ice-water of a solution of 2.8 parts by weight of pentaethyleneglycol-methyl-ether-methylamine of the formula

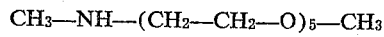

in 10 parts by volume of benzene and 6 parts by weight of anhydrous potash. After the acid chloride has finished running in 3 parts by weight of potash are added and the whole is allowed to stand for 4 hours in a cold bath whose temperature gradually rises to 20° C. while stirring.

By suction-filtration of the undissolved salts and evaporation of the filtrate in vacuo there is obtained an almost colorless oil containing 4.8 parts by weight of the new amide and 0.2 part by weight of the unchanged pentaethyleneglycol-methylether-methylamine. The mixture is separated by washing its chloroform solution neutral with hydrochloric acid of 5% strength, caustic soda solution of 5% strength and water. By evaporation of the chloroform solution there is obtained the new amide of the formula

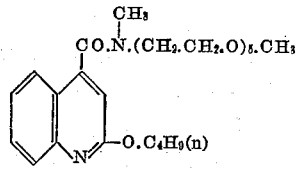

as a colorless oil, which is clearly soluble in cold water and is separated from the solution of 10% strength by heating at 22–23° C. as a milky turbidity.

The 2-n-butoxy-cinchoninic acid chloride used as starting material may be obtained as follows:

2.5 parts by weight of 2-n-butoxy cinchoninic acid are dissolved in 20 parts by volume of benzene, and 8 parts by volume of thionyl-chloride are added. The mixture is then warmed for a short time at 50–60° C., whereupon a clear yellow solution is obtained which is evaporated in vacuo with the exclusion of moisture. 50 parts by volume of benzene are added to the oily residue and the solution is evaporated again. After repeating this operation once more the residue is taken up in 50 parts by volume of cold petroleum ether and filtered with suction from 0.1 part by weight of a yellow undissolved product. From the almost colorless filtrate there is obtained by evaporation in vacuo 2.5 parts by weight of acid chloride crystallizing in needles and flakes melting at 38–39° C.

The pentaethyleneglycol-methylether-methylamine used as starting material can be obtained in the following manner:

530 parts by weight of benzene-sulfonic acid ester of di-ethyleneglycol-monomethylether are allowed to run in the course of 4 hours at 100° C. while stirring into a solution of 50 parts by weight of sodium in 800 parts by volume of triethyleneglycol and the reaction mixture is kept over night at 100° C. After cooling, 500 parts by volume of water and 1000 parts by volume of chloroform are added and the whole well agitated. The chloroform layer is extracted twice with 250 parts by volume of water each time and then evaporated. There are left 220 parts by weight of crude pentaethyleneglycol-monomethylether. By extracting the three water layers 5 times with 500 parts by volume of chloroform each time there are obtained a further 250 parts by weight of crude pentaethyleneglycol-monomethylether. From the crude product there is obtained 400 parts by weight of pure ether as colorless oil by distillation under 0.01 mm. pressure of mercury and at 110° C.

50 parts by weight of pentaethyleneglycol-monomethylether are dissolved in 100 parts by volume of benzene. 35 parts by volume of benzene sulfochloride are added dropwise to the solution during half an hour while stirring and cooling to 20–30° C. At the same time 15 parts by weight of pulverized sodium hydroxide are introduced in equal portions. The whole is stirred for a further 2½ hours and then allowed to stand without stirring over night. The precipitated salts are removed by filtering with suction, and the filtrate is agitated with 20 parts by volume of aqueous ammonia of 25% strength for 4 hours. Any remaining benzene-sulfochloride is thus converted into the alkali-soluble sulfamide. 50 parts by volume of caustic soda solution of 10% strength are added and the whole is well agitated. The aqueous layer is extracted again with 150 parts by volume of benzene and the two benzene extracts are washed consecutively with 50 parts by volume of caustic soda solution of 10% strength and 50 parts by volume of water. By evaporating the dried benzene solution there are obtained 70 parts by weight of benzene-sulfonic acid ester of pentaethyleneglycol-monomethylether free from solvent as an almost colorless oil.

10 parts by weight of this product are heated for 12 hours in an autoclave to 80° C. after being dissolved in 10 parts by volume of ethanolic methylamine of 33% strength. By evaporating the reaction mixture in a water jet vacuum there are obtained 11 parts by weight of a viscous residue which is dissolved in 20 parts by volume of hydrochloric acid of 5% strength and then extracted 3 times with 20 parts by volume of chloroform each time, which itself is washed twice with 20 parts by volume of hydrochloric acid of 5% strength each time.

16 parts by volume of caustic soda solution of 30% strength and 10 parts by weight of sodium chloride are added to the combined aqueous layers. After extracting 3 times with 50 parts by volume of chloroform each time and washing the separate extracts with the same 10 parts by volume of saturated aqueous sodium chloride solution there are obtained 6.5 parts by weight of basic products, from which there are distilled under 0.001 mm. pressure of mercury and at 93° C. 3.8 parts by weight of pentaethyleneglycol-monomethylether-methylamine as a colorless oil.

Example 2

2.5 parts by weight of 2-n-butoxy-cinchoninic acid chloride are dissolved in 25 parts by volume of benzene and added in the course of half an hour while stirring briskly to a mixture cooled in ice-water of a solution of 4 parts by weight of heptaethyleneglycol-methylether-methylamine of the formula

$$CH_3-HN.(CH_2.CH_2.O)_7.CH_3$$

in 10 parts by volume of benzene and 6 parts by weight of anhydrous potash. After the acid chloride has finished running in, 3 parts by weight of potash are added and the whole is allowed to stand for 4 hours in a cold bath whose temperature gradually rises to 20° C. while stirring.

By filtering the undissolved salts with suction and evaporating the filtrate in vacuo, there is obtained an almost colorless oil containing 5.2 parts by weight of the new amide and 0.8 part by weight of unchanged heptaethyleneglycol-methylether-methylamine. The mixture may be separated by washing its chloroform solution neutral with hydrochloric acid of 5% strength, caustic soda solution of 5% strength and water. By evaporation of the chloroform solution there is obtained the new amide of the formula

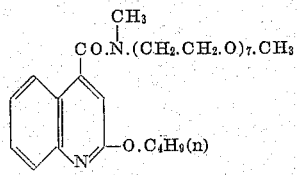

as a colorless oil which is clearly soluble in cold water and is separated from the solution of 10% strength by heating at 41° C. as a milky turbidity.

The heptaethyleneglycol-methylether-methylamine used as starting material may be obtained as follows:

40 parts by weight of the benzene-sulfonic acid ester of pentaethyleneglycol-monomethylether described in Example 1 are introduced dropwise in the course of an hour while stirring at 100° C. into a solution of 2.3 parts by weight of sodium in 95 parts by volume of diethyleneglycol and the reaction mixture is kept at 100° C. over night. After cooling, 250 parts by volume of water are added and the whole then well agitated with 100 parts by volume of chloroform. It is then extracted a further 7 times with 100 parts by volume of chloroform each time and the chloroform extracts are washed separately 4 times with 100 parts by volume of water each time. On evaporation the chloroform extracts leave behind 32 parts by weight of an oily residue, from which 29.5 parts by weight of heptaethyleneglycol monomethylether are distilled in high vacuum under a pressure of 0.005 mm. and at 150° C. as a colorless oil.

25.6 parts by weight of heptaethyleneglycol-monomethylether are dissolved in 35 parts by volume of benzene and 13.5 parts by volume of benzene-sulfochloride are added dropwise during an hour while stirring and cooling at 20–30° C. Before instilling the sulfochloride, 2 parts by weight of powdered sodium hydroxide are added and then 4 parts by weight thereof are introduced in portions of 1 part by weight each at intervals of 15 minutes. The whole is then stirred for a further 2 hours and then left to stand over night without stirring. 50 parts by volume of water and 25 parts by volume of benzene are then stirred in and the two layers separated. The aqueous layer is extracted with 50 parts by volume of benzene. The combined benzene extracts are agitated for 4 hours after adding 5 parts by volume of aqueous ammonia of 25% strength. 10 parts by volume of caustic soda solution of 10% strength are then added, well agitated and the benzene layer separated off and washed with 10 parts by volume of caustic soda solution of 10% strength and 10 parts by volume of half-saturated aqueous sodium chloride solution. All the water layers are extracted separately with the same 50 parts by volume of benzene. From the combined benzene solutions there are obtained 31.50 parts by weight of benzene-sulfonic acid ester of heptaethyleneglycol-monomethylether as an almost colorless oil.

16 parts by weight of this product are dissolved in 30 parts by volume of ethanolic methylamine of 33% strength and heated in an autoclave for 12 hours at 75° C. After evaporating there remain behind 17.5 parts by weight of a viscous brown oil which is dissolved in 20 parts by volume of hydrochloric acid of 5% strength. The hydrochloric solution is extracted 3 times with 20 parts by volume of chloroform each time. The chloroform extracts are washed separately twice with 20 parts by volume of hydrochloric acid of 5% strength each time. The combined hydrochloric aqueous solutions are made alkaline with 16 parts by volume of caustic soda solution of 30% strength and extracted 3 times with 50 parts by volume of chloroform each time. The chloroform extracts are washed separately with the same 10 parts by volume of water and then evaporated. They yield 11 parts by weight of a residue from which there are distilled 9.5 parts by weight of heptaethylene-glycol-methylether-methylamine under 0.001 mm. pressure of mercury at 135° C. as a colorless oil.

Example 3

2.5 parts by weight of 2-n-butoxy-cinchoninic acid chloride are dissolved in 25 parts by volume of benzene and added in the course of half an hour while stirring briskly to a mixture cooled in ice-water of a solution of 5 parts by weight of nonaethyleneglycol-methylether-methylamine of the formula

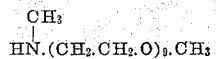

$$HN.(CH_2.CH_2.O)_9.CH_3$$

in 10 parts by volume of benzene and 6 parts by weight of anhydrous potash. After the acid chloride has finished running in, 3 parts by weight of potash are added and the whole is allowed to stand for 4 hours in a cold bath whose temperature gradually rises to 20° C. while stirring.

After filtering off the undissolved salts with suction and evaporating the filtrate in vacuo an almost colorless oil is obtained which contains 6.5 parts by weight of the new amide and 0.7 part by weight of unchanged monaethyleneglycol-methylether-methylamine. The mixture may be separated by washing its cholorform solution neutral with hydrochloric acid of 5% strength, caustic soda solution of 5% strength and water. By evaporation of the chloroform solution there is obtained the new amide of the formula

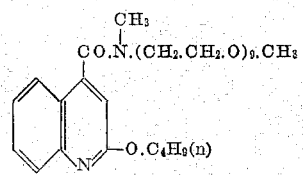

as a colorless oil which is clearly soluble in cold water and is separated from the solution of 10% strength by heating at 56–57° C. as a milky turbidity.

The nonaethyleneglycol-methylether-methylamine used as starting material can be prepared as follows:

95 parts by weight of the benzene-sulfonic acid ester of heptaethyleneglycol-monomethylether described in Example 2 are introduced dropwise into a solution of 4.6 parts by weight of sodium in 70 parts by volume of diethylene glycol in the course of 2 hours at 100° C. while stirring. The mixture is kept at 100° C. over night and then allowed to cool. Thereupon 100 parts by volume of water and 200 parts by volume of choloroform are stirred in and the two layers separated. The aqueous layer is extracted 4 times with 100 parts by volume of chloroform each time and each chloroform extract is washed with the same 100 parts by volume of water. The combined chloroform solutions yield 83 parts by weight of a residue after evaporation, from which there are distilled 70 parts by weight of nonaethylene glycol-monomethylether under a pressure of 0.002 mm. and at 185° C. as a colorless oil. After adding 2 parts by weight of powdered sodium hydroxide, 10 parts by volume of benzene sulfo-chloride are instilled into a solution of 22 parts by weight of the monomethylether in 25 parts by volume of benzene in the course of 30 minutes while stirring at 20–30° C. After an interval of 15 minutes 1 part by weight of sodium hydroxide is added and another part after 30 minutes. The whole is then stirred for a further 2½ hours and left to stand over night. 20 parts by volume of water are stirred in and the aqueous layer separated off and extracted with 25 parts by volume of benzene. The combined benzene solutions are agitated together with 2.5 parts by volume of aqueous ammonia of 25% strength for 4 hours. Before expiration of this time, 5 parts by volume of caustic soda solution of 10% strength and the aqueous layer separated off before the treatment with ammonia are added. The benzene layer is separated off and the aqueous layer is extracted again with 25 parts by volume of benzene. Both benzene extracts are washed consecutively with 5 parts by volume of caustic soda solution of 10% strength and then with 5 parts by volume of water. After evaporating the benzene they yield 29 parts by weight of the benzene sulfonic acid ester of nonaethyleneglycol-mono-methylether as an almost colorless oil.

28 parts by weight of this benzene sulfonic acid ester are dissolved in 50 parts by volume of ethanolic methylamine of 33% strength and heated in an autoclave for 14 hours to 80° C. After evaporating the reaction mixture there are obtained 30.5 parts by weight of a viscous oil which after being dissolved in 30 parts by volume of hydrochloric acid of 5% strength is extracted 3 times with 30 parts by volume of chloroform each time. Each chloroform extract is washed separately twice with 30 parts by volume of hydrochloric acid of 5% strength each time.

After adding 20 parts by volume of caustic soda solution of 30% strength to the combined hydrochloric layers they are extracted 3 times with 100 parts by volume of chloroform each time. The chloroform extracts are washed separately with 20 parts by volume of water and then evaporated together. There remain 19.5 parts by weight of crude amine from which 18.5 parts by weight of nonaethyleneglycol-methylether-methylamine was distilled under a pressure of 0.005 mm. of mercury and at 175° C. as a colorless oil.

*Example 4*

2.64 parts by weight of 2-n-butoxy-quinoline-4-carboxylic acid chloride described in Example 1 are dissolved in 50 parts by volume of benzene and heated at 80° C. for a short time with 12.5 parts by weight of the amine having the formula $$CH_3.NH.(CH_2.CH_2O)_{13}.CH_3$$

in which 13 is an average value.

The basic polyglycol derivative in excess can be removed after evaporation of the reaction mass in vacuo by distribution between chloroform and dilute hydrochloric acid. It is present as hydrochloride in the dilute hydrochloric acid and can be regenerated by extraction after being rendered alkaline.

For the removal of a few partially brownish impurities the chloroform residue is distributed several times between much benzene and a little dilute hydrochloric acid and dilute sodium carbonate solution. The purified product is present in the benzene and is obtained therefrom by evaporation in the form of a very faintly yellowish thick oil. The new compound has the formula

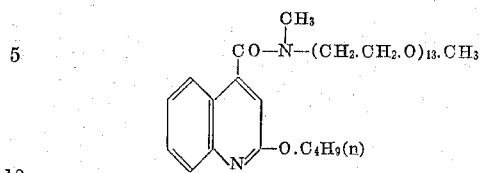

wherein 13 is an average value.

It is soluble in almost all organic solvents with the exception of aliphatic hydrocarbons and also readily soluble in water, but precipitates as oil on heating an aqueous solution to over 70° C. which oil dissolves easily again on cooling.

The amine used as starting material in this example may be prepared in the following manner:

Polyethyleneglycol-monomethylether of an average molecular weight of 550 (obtainable under the trade name methoxypolyethyleneglycol 550) is converted into the benzene sulfonic acid ester in the usual manner. 100 parts by weight of the ester are heated with 450 parts by weight of alcoholic methylamine solution of 33% strength for 14 hours in a closed vessel at 72–75° C. After distilling off the alcohol under reduced pressure at 60–70° C. the oily residue is taken up in 150 parts by volume of chloroform and extracted by agitation consecutively with 300 parts by volume, 150 parts by volume and 100 parts by volume of hydrochloric acid of 18% strength. The three hydrochloric solutions are washed twice with 100 parts by volume of chloroform each time. The combined hydrochloric solutions are rendered alkaline to titanium yellow with concentrated caustic soda solution while cooling and then extracted with chloroform exhaustively. The chloroform extract washed with saturated sodium chloride solution is evaporated and dried in vacuo at 60–70° C. The residue is a pale yellow, water-soluble oil and weighs 79 parts by weight. Titration with normal hydrochloric acid shows the average molecular weight to be 609.

*Example 5*

2.64 parts by weight of 2-n-butoxyquinoline-4-carboxylic acid chloride are added to a solution of 7.5 parts by weight of the amine of the formula $$CH_3(O.CH_2.CH_2)_{14}NH.C_4H_9 \ (n)$$

in which 14 is an average value and 1.5 parts by weight of absolute pyridine in 20 parts by volume of absolute benzene. After allowing the mixture to stand over night with exclusion of moisture at 30–40° C. it is heated for 5–10 minutes to the boil and then diluted with 70 parts by volume of benzene. The whole is then extracted by agitation 4 times with 5.5 parts by volume of 2-n-hydrochloric acid each time and the acid solutions are washed three times with 90 parts by volume of benzene each time. The combined benzene solutions dried with potash are evaporated, whereupon there is obtained after drying the residue in vacuo at 70° C. the amide of the formula

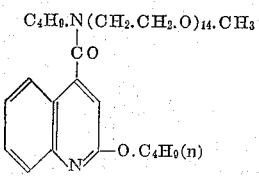

in which 14 is an average value in the form of a weakly brownish oil. The yield amounts to 5.5 parts by weight. Further quantities which are somewhat darker in color, can be obtained by extraction of the hydrochloric acid solutions with chloroform. The new amide is soluble in alcohol, acetone and ethyl acetate; it is also soluble in water at temperatures below 64° C.

The amine used as starting material in this example may be prepared in the following manner:

The benzene-sulfonic acid ester of polyethylene-glycol-monomethylether of an average molecular weight of 787 is boiled with the same quantity of n-butylamine for 20 hours under reflux. 100 parts by weight of the reaction mass are freed from the main quantity of volatile substances by heating to 70–80° C. in vacuo and dissolved in 250 parts by volume of chloroform. The solution is then extracted by agitation 3 times consecutively with 50 parts by volume of 2-n.caustic soda solution each time. After washing the alkaline water solution twice with 120 parts by volume of chloroform each time, the combined chloroform solutions are dried with sodium sulfate and evaporated. After drying the residue at 70–80° C. under a pressure of 1 mm. of mercury, 44.1 parts by weight of a pale brown oil are obtained. For further purification the oil is taken up in 250 parts by volume of chloroform and agitated successively three times with 150, 50 and 50 parts by volume of hydrochloric acid of 18% strength. After washing the acid aqueous solutions six times with 100 parts by volume of chloroform each time, they are made alkaline to titanium yellow with concentrated caustic soda solution while cooling and extracted exhaustively with chloroform. The chloroform extract washed with 50 parts by volume of saturated sodium chloride solution is dried with potash and evaporated. After drying at 70° C. under a pressure of 0.1 mm., 8.8 parts by weight of the above used amine are obtained with an average molecular weight of 701 according to titration with n-hydrochloric acid.

*Example 6*

12.3 parts by weight of 2-chloro-cinchoninic acid chloride are dissolved in 120 parts by volume of anhydrous benzene and in the course of 1½ hours while stirring briskly are allowed to run into a mixture cooled in ice-water of a solution of 7.6 parts by weight of diethyleneglycol-methylether-methylamine of the formula $$CH_3.O.CH_2.CH_2.O.CH_2.CH_2.NH.CH_3$$

(boiling at 58° C. under 9 mm. pressure) in 50 parts by volume of benzene and 21 parts by weight of anhydrous potash. After the acid chloride has finished running in, the whole is allowed to stand for 4 hours in a cold bath whose temperature gradually rises to 20° C. while stirring.

By filtering the undissolved salts with suction and washing the filtrate neutral with hydrochloric acid of 5% strength, caustic soda solution of 5% strength and water, drying and evaporating, there are obtained 17 parts by weight of a residue from which 16.5 parts by weight are distilled in high vacuum at 152° C. The amide thus obtained of the formula

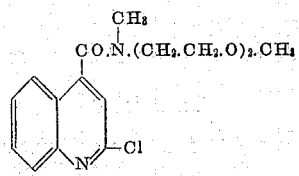

is a colorless, slightly opalescent oil.

A solution of 1 part by weight of sodium in 40 parts by volume of anhydrous ethanol are added to 6.5 parts by weight of this amide and heated for 4 hours on a water-bath. Immediately after adding the sodium-ethanolate solution, sodium chloride begins to precipitate in the form of a milky turbidity and after a short time forms an ample precipitate.

The reaction mixture is evaporated in a water-jet vacuum and the residue taken up in chloroform. By washing the chloroform solution neutral with hydrochloric acid of 5% strength, caustic soda solution of 5% strength and water, drying and evaporating there are obtained 6.7 parts by weight of a residue from which 6.5 parts by weight of a colorless oil with slightly opalescent turbidity is distilled out in high vacuum at 160° C. The amide thus obtained has the formula

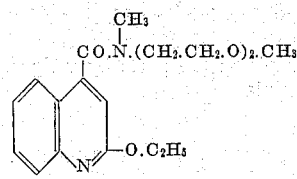

The diethyleneglycol-methylether-methylamine used as starting material is obtained by stirring in 52 parts by weight of benzene-sulfonic acid ester of diethyleneglycol-monomethylether into 200 parts by volume of an ethanolic solution of methylamine of 33% strength and allowing the reaction mixture to stand for 2 days. The oily viscous residue obtained on evaporation is dissolved in 50 parts by volume of hydrochloric acid of 2% strength and extracted 3 times with 100 parts by volume of chloroform each time. The chloroform extracts are washed with 25 parts by volume of hydrochloric acid of 2% strength. To the combined hydrochloric layers there are added 25 parts by volume of caustic soda solution of 30% strength and the whole is then extracted 5 times with 100 parts by volume of chloroform each time. There are obtained 35 parts by weight of crude amine by evaporation, out of which 15 parts by weight of diethyleneglycol-methylether-methylamine are distilled in a water jet vacuum of 9 mm. and at 58° C. as a colorless oil.

*Example 7*

A solution of 1 part by weight of sodium in 40 parts by volume of anhydrous butanol is added to 6.5 parts by weight of the amide of the formula

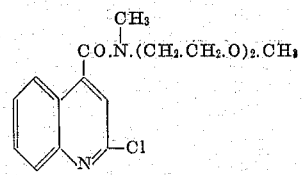

prepared according to Example 6 and heated for 4 hours on a water-bath. By filtering the undissolved salts with suction and washing the filtrate neutral with hydrochloric acid of 5% strength, caustic soda solution of 5% strength and water, drying and evaporating, there are obtained 7.7 parts by weight of a residue from which 6.8 parts by weight of the amide having the formula

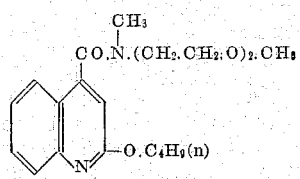

are distilled out in high vacuum at 165° C. It is a yellow colored, weakly opalescent oil, which on warming finally becomes colorless and clearly transparent.

*Example 8*

2.5 parts by weight of 2-n-butoxy-cinchoninic acid chloride are dissolved in 25 parts by volume of benzene and added in the course of an hour while stirring briskly to a mixture cooled in ice-water of a solution of 5 parts by weight of heptaethyleneglycol-methylether-2-aminopropyl-ether of the formula

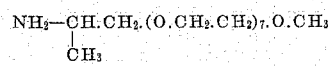

in 10 parts by volume of benzene and 10 parts by weight of anhydrous potash. After the acid chloride has finished running in, the whole is allowed to stand for 4 hours in a cold bath the temperature of which gradually increases to 20° C. while stirring.

By filtering the undissolved salts with suction and evaporating the filtrate in vacuo there is obtained an almost colorless oil, which after being taken up in chloroform and washed neutral with hydrochloric acid of 5% strength, caustic soda solution of 5% strength and water, dried and evaporated yields 6.2 parts by weight of the amide having the formula

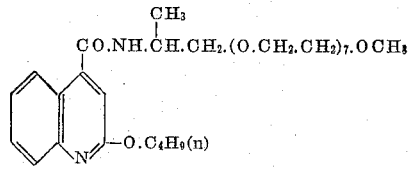

It is a colorless oil which is clearly soluble in cold water and is separated from a solution of 10% strength by heating to 36–37° C. as a milky turbidity.

The amine used as starting material may be prepared as follows:

94 parts by weight of the benzene sulfonic acid ester of heptaethyleneglycol-monomethyl ether described in Example 2 are instilled into a solution of 4.6 parts by weight of sodium in 70 parts by volume of 1.2-propyleneglycol at 100° C., and while stirring for 3 hours with subsequent heating to 100° C. during 10 hours, there is obtained a reaction mixture in which solid portions have been precipitated. After cooling, 100 parts by volume of water and 200 parts by volume of chloroform are stirred in and the chloroform layer is extracted again by agitation with 100 parts by volume of water. The two water layers are extracted 4 times consecutively with 100 parts by volume of chloroform each time. The combined chloroform extracts yield 78 parts by weight of an oily crude product, out of which 70 parts by weight of heptaethyleneglycol-(methylether)-(2-oxy-n-propylether) are distilled under a pressure of 0.002 mm. of mercury and at 173° C. as a colorless oil.

4 parts by weight of powdered sodium hydroxide are introduced into a solution of 40 parts by weight of the above product in 50 parts by volume of benzene and then 20 parts by volume of benzene-sulphochloride are instilled during 30 minutes while stirring at 25–35° C. After an interval of 15 and 30 minutes 2 parts by weight of powdered sodium hydroxide are added respectively and the whole is then stirred for another 2½ hours. After allowing the whole to stand over night 40 parts by volume of water are stirred in and the water layer extracted by agitation with 50 parts by volume of benzene. The combined benzene extracts are agitated together with 5 parts by volume of aqueous ammonia of 25% strength for 7 hours and finally after adding 10 parts by volume of caustic soda solution of 10% strength and the first aqueous layer the whole is agitated for a short time. The water layer is extracted with 50 parts by volume of benzene. The two benzene layers are washed consecutively with 10 parts by volume of caustic soda solution of 10% strength and 10 parts by volume of saturated aqueous sodium chloride solution. After evaporation there is obtained 53 parts by weight of the benzene-sulfonic acid ester of heptaethyleneglycol-(methylether)-(2-oxy-n-propylether) as an almost colorless oil.

50 parts by volume of an aqueous solution of ammonia of 34% strength are added to 27 parts by weight of the benzene sulfonic acid ester in an autoclave with agitator and heated for 6 hours at 80° C. while stirring. After cooling, the greater quantity of the ammonia is evaporated in a water jet vacuum and the residue is made acid to Congo by adding 1 part by volume of concentrated hydrochloric acid. The whole is extracted three times with 50 parts by volume of benzene each time, and the benzene extracts are washed twice consecutively with 20 parts by volume of hydrochloric acid of 5% strength each time. The combined aqueous layers to which are added 15 parts by volume of caustic soda solution of 30% strength, are extracted 3 times with 100 parts by volume of chloroform each time, and the extracts are washed separately with 10 parts by volume of water. On evaporation they yield 19 parts by weight of crude amine from which 17.5 parts by weight of heptaethyleneglycol-(methyl-ether)-(2-amino-n-propyl-ether) are distilled in high vacuum under a pressure of 0.001 mm. of mercury and at 150° C. as a colorless oil.

*Example 9*

2.8 parts by weight of 2-cyclopentoxy-cinchoninic acid chloride are dissolved in 25 parts by volume of benzene and added in the course of an hour while stirring briskly to a mixture cooled in ice-water of a solution of 4.4 parts by weight of heptaethyleneglycol-methylether-methylamine of the formula

described in Example 2, in 10 parts by volume of benzene and 10 parts by weight of anhydrous potassium carbonate. After the acid chloride has finished running in, the whole is allowed to stand for 4 hours in a cold bath whose temperature gradually rises to 20° C. while stirring.

By filtering the undissolved salts with suction and evaporating the filtrate in vacuo there is obtained an almost colorless oil, which after being taken up in chloroform, washed neutral with hydrochloric acid of 5% strength, caustic soda solution of 5% strength and water, dried and evaporated, yields 6.2 parts by weight of the amide of the formula

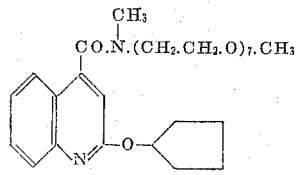

The amide is a colorless oil which is clearly soluble in cold water and is separated from a solution of 10% strength by heating at 40–41° C. as a milky turbidity.

The 2-cyclopentoxy-cinchoninic acid chloride may be prepared as follows:

2-chloro-cinchoninic acid chloride is reacted with an excess of sodium cyclopentanolate at 100° C., whereby the cyclopentyl ester of 2-cyclopentoxy-cinchoninic acid is obtained in an almost quantitative yield. This ester is saponified to the free acid by heating it in an aqueous-methanolic potassium hydroxide solution for half an hour. The free acid after recrystallization from benzene melts at 162–164° C., and solidifies again on further heating. The brownish needles present at a temperature of 280° C. decompose at a temperature above 300° C.

3.18 parts by weight of the thus obtained free acid are converted into the acid chloride in a manner analogous to that described in Example 1 for the preparation of 2-n-butoxy-cinchoninic acid chloride melts at 88–89° C. after recrystallization from petroleum ether of low boiling point.

*Example 10*

2.6 parts by weight of the 2-n-butoxy-cinchoninic acid chloride described in Example 1 are dissolved in 25 parts by volume of benzene and in the course of 1½ hours added, while stirring briskly, to a mixture cooled in ice-water of a solution of 4.2 parts by weight of pentaethyleneglycol-monoamine of the formula

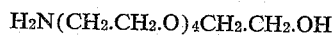

in 10 parts by volume of benzene and 10 parts by weight of anhydrous potash. After the acid chloride has finished running in, the whole is stirred for a further 4 hours in a cold bath whose temperature gradually increases to 20° C. By filtering the undissolved salts with suction and evaporating the filtrate in vacuo, there is obtained an almost colorless oil from which, after washing its chloroform solution neutral with hydrochloric acid of 5% strength, caustic soda solution of 5% strength and water, and evaporating, there are obtained 4.9 parts by weight of the new amide having the formula

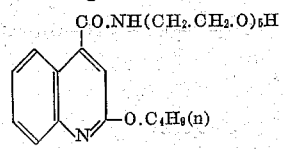

The new amide is a colorless oil which is clearly soluble in cold water and is separated from a solution of 10% strength by heating to 19–20° C. as a milky turbidity. The aqueous solution has a neutral reaction to litmus.

The amine used in this example can, for example, be obtained in the following manner:

400 parts by volume of triethyleneglycol are dissolved in 3000 parts by volume of chloroform. In the course of 2 hours 200 parts by volume of benzene-sulfochloride and 400 parts by volume of caustic soda solution of 17% strength are introduced dropwise at a temperature of 15–30° C. while stirring. The whole is stirred for a further 2 hours and the following day the two layers are separated after again stirring well. The aqueous layer is extracted three times more with 500 parts by volume of chloroform each time. Each layer of chloroform is agitated separately with 4 portions of water of 1000 parts by volume each, the same portions being used for all chloroform layers, and the layers are then evaporated together. They leave behind 420 parts by weight of an almost colorless oil which is agitated mechanically together with 4000 parts by volume of water during 3 hours. The undissolved oily portions are separated off, and the operation is repeated twice more with 4000 parts by volume of water each time, and finally a last time with 1500 parts by volume of water. There are thus obtained 4 aqueous extracts which are extracted separately twice with 1000 parts by volume of chloroform each time. After evaporating the chloroform extracts here are obtained 320 parts by weight of triethyleneglycolmono-benzenesulfonic acid ester as a brownish oil. The 50 parts by weight of water-insoluble oil being allowed to stand yields the crystallized di-ester as chief product.

120 parts by weight of mono-benzene-sulfonic acid ester of triethyleneglycol are allowed to run into a solution of 9.5 parts by weight of sodium in 140 parts by volume of diethyleneglycol during 3 hours while stirring at 100° C. and kept over night at 100° C. To the reaction mixture which contains solid portions are added 500 parts by volume of benzene and 250 parts by volume of chloroform. The solids are then removed by suction-filtering. After evaporating the solvents, an oil remains behind from which there may be distilled off about 100 parts by weight of diethyleneglycol in the water jet vacuum. The residue contains solid portions which, after agitation of the whole with a mixture of 200 parts by volume of benzene and 200 parts by volume of chloroform, may be filtered off with suction. In this way there may be separated off a total of 65–70 parts by weight of sodium benzene sulfonate. The residue obtained on evaporating the filtrate is distilled in a water-jet vacuum to remove diethyleneglycol and then subjected twice to fractionating distillation in a high vacuum. Finally there are obtained 75 parts by weight of colorless pentaethyleneglycol under a pressure of 0.01 mm. of mercury at 130° C. which, on being distilled, practically does not wet the glass walls and flows off in big drops.

50 parts by weight of pentaethyleneglycol are dissolved in 200 parts by volume of chloroform to which are added dropwise 15 parts by volume of benzene sulfochloride and 30 parts by volume of caustic soda solution of 17% strength in the course of half an hour at 15–30° C. while stirring. The whole is stirred for another 2½ hours and the two layers are separated after being left to stand over night. The aqueous layer is extracted three times more by agitation with 100 parts by volume of chloroform each time. The chloroform extracts are agitated consecutively with 3 portions of water of 50 parts by volume each, the same portions being used for all chloroform layers. On evaporation the combined chloroform extracts leave 43 parts by weight of a pale yellow oil behind which is dissolved in 500 parts by volume of water to remove the diester still present. After extracting three times with 200 parts by volume of carbon tetrachloride each time there may be separated off 4 parts by weight of the diester. After extracting the aqueous solution exhaustively with trichloroethylene there may be obtained a total of 36 parts by weight of mono-benzene-sulfonic acid ester of pentaethyleneglycol as an almost colorless oil. 50 parts by volume of aqueous ammonia of 34% strength are added to 17.5 parts by weight of mono-benzene-sulfonic acid ester of pentaethyleneglycol and heated in an autoclave with stirrer for 6 hours at 75° C. The main quantity of the ammonia is then evaporated into the water jet vacuum. The aqueous solution is rendered acid to Congo by adding 1 part by volume of concentrated hydrochloric acid and is then extracted three times with 50 parts by volume of chloroform each time. The aqueous layer is rendered strongly alkaline with 8 parts by weight of powdered sodium hydroxide and extracted exhaustively with chloroform portions of 50 parts by volume. On evaporation, the extract yields 9 parts by weight of crude amine from which there are distilled 6 parts by weight of pentaethyleneglycol-monoamine in high vacuum under a pressure of 0.01 mm. of mercury and at 118° C. as a colorless oil.

What is claimed is:

1. A quinoline carboxylic acid amide of the formula:

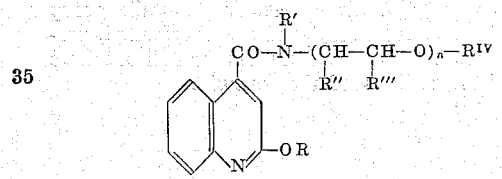

wherein R stands for a member selected from the group consisting of alkyl and cyclo alkyl radicals containing 2 to 7 carbon atoms, R' and $R^{IV}$ each stands for a member selected from th group consisting of hydrogen and alkyl radicals containing 1 to 7 carbon atoms, $n$ is an integer from 2 to 25, and wherein one of the radicals R'' and R''' stands for hydrogen, and the other for a member selected from the group consisting of hydrogen, methyl and methoxymethyl, provided that it stands for hydrogen in more than half of the radicals of the formula:

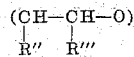

2. A quinoline carboxylic acid amide of the formula:

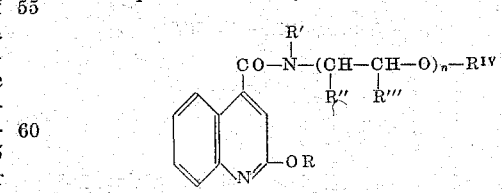

wherein R stands for an alkyl radical containing 2 to 7 carbon atoms, one of the radicals R' and $R^{IV}$ stands for hydrogen and the other for an alkyl radical containing 1 to 7 carbon atoms, $n$ is an integer from 5 to 25, and wherein one of the radicals R'' and R''' stands for hydrogen, and the other for a member selected from the group consisting of hydrogen, methyl and methoxymethyl, provided that it stands for hydrogen in less than all but more than half of the radicals of the formula:

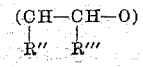

3. A quinoline carboxylic acid amide of the formula:

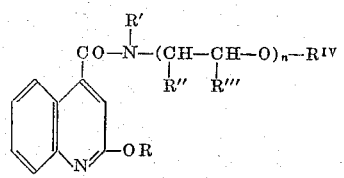

wherein R stands for an alkyl radical containing 2 to 7 carbon atoms, R' and R$^{IV}$ each stands for an alkyl radical containing 1 to 7 carbon atoms, $n$ is an integer from 5 to 25, and wherein one of the radicals R'' and R''' stands for hydrogen, and the other for a member selected from the group consisting of hydrogen, methyl and methoxymethyl, provided that it stands for hydrogen in less than all but more than half of the radicals of the formula:

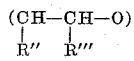

4. A quinoline carboxylic acid amide of the formula:

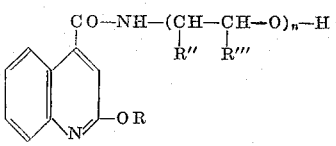

wherein R stands for an alkyl radical containing 2 to 7 carbon atoms and $n$ is an integer from 5 to 25, and wherein one of the radicals R'' and R''' stands for hydrogen and the other for a member selected from the group consisting of hydrogen, methyl and methoxymethyl, provided that it stands for hydrogen in less than all but more than half of the radicals of the formula:

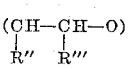

5. A quinoline carboxylic acid amide of the formula

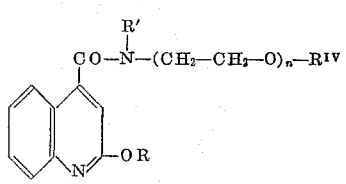

wherein R stands for an alkyl radical containing 2–7 carbon atoms, one of the radicals R' and R$^{IV}$ stands for hydrogen and the other for an alkyl radical containing 1–7 carbon atoms and $n$ is an integer from 5 to 25.

6. A quinoline carboxylic acid amide of the formula

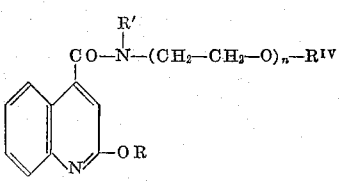

wherein R stands for an alkyl radical containing 2–7 carbon atoms, R' and R$^{IV}$ each stands for an alkyl radical containing 1–7 carbon atoms and $n$ is an integer from 5 to 25.

7. A quinoline carboxylic acid amide of the formula

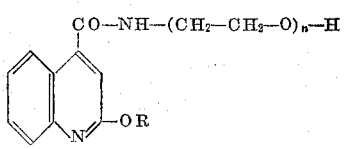

wherein R stands for an alkyl radical containing 2–7 carbon atoms and $n$ is an integer from 5–25.

8. A quinoline carboxylic acid amide of the formula

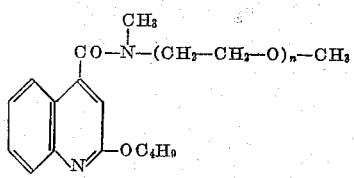

wherein $n$ is an integer from 5 to 9.

9. The quinoline carboxylic acid amide of the formula

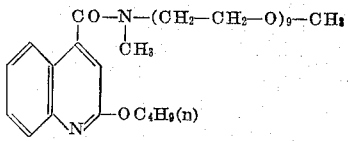

10. A quinoline carboxylic acid amide of the formula

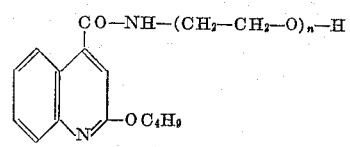

wherein $n$ is an integer from 5 to 9.

11. A quinoline carboxylic acid amide of the formula

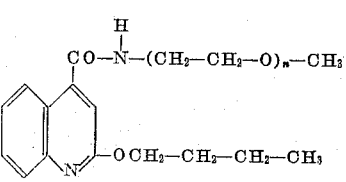

wherein $n$ is an integer from 5 to 9.

12. The quinoline carboxylic acid amide of the formula

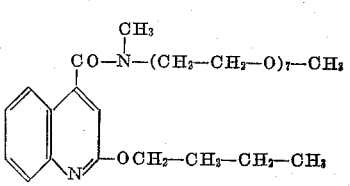

13. The quinoline carboxylic acid amide of the formula

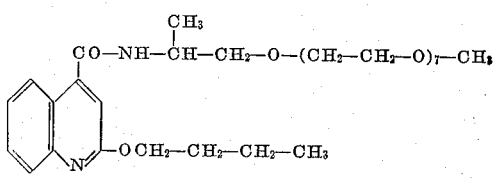

14. The quinoline carboxylic acid amide of the formula

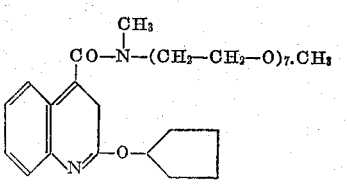

15. The quinoline carboxylic acid amide of the formula

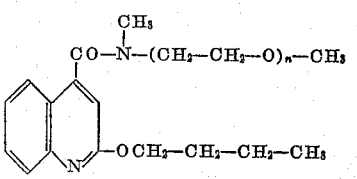

wherein $n$ has an average value of about 13.

16. The quinoline carboxylic acid amide of the formula
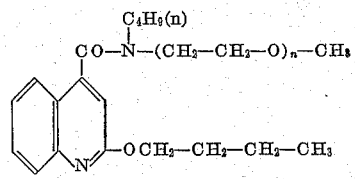
wherein $n$ has an average value of about 14.
17. The quinoline carboxylic acid amide of the formula
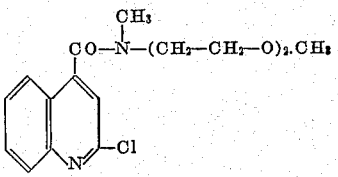
References Cited in the file of this patent
UNITED STATES PATENTS
| | | |
|---|---|---|
| 2,173,069 | Ulrich et al. | Sept. 12, 1939 |
| 2,304,830 | Katzman | Dec. 15, 1942 |
| 2,456,911 | Bruce et al. | Dec. 21, 1948 |
| 2,556,146 | Olsen | June 5, 1951 |
| 2,585,826 | Olsen | Feb. 12, 1952 |
| 2,622,073 | Ferrero et al. | Dec. 16, 1952 |
| 2,622,099 | Ferrero et al. | Dec. 16, 1952 |